(12) United States Patent
Sato

(10) Patent No.: US 7,760,916 B2
(45) Date of Patent: Jul. 20, 2010

(54) REGISTRATION APPARATUS, COLLATION APPARATUS, IMAGE CORRECTION METHOD AND PROGRAM

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 943 days.

(21) Appl. No.: 11/551,393

(22) Filed: Oct. 20, 2006

(65) Prior Publication Data

US 2007/0122014 A1 May 31, 2007

(30) Foreign Application Priority Data

Oct. 31, 2005 (JP) .................... P2005-316896

(51) Int. Cl.
*G06K 9/00* (2006.01)
(52) U.S. Cl. ...................... 382/115; 382/126
(58) Field of Classification Search ................. 382/154
See application file for complete search history.

(56) References Cited

U.S. PATENT DOCUMENTS

| 6,813,010 | B2 * | 11/2004 | Kono et al. ............... 356/71 |
| 2002/0028004 | A1 * | 3/2002 | Miura et al. ............. 382/124 |
| 2005/0129325 | A1 * | 6/2005 | Wu ........................... 382/254 |

FOREIGN PATENT DOCUMENTS

| JP | 62-210590 A | 9/1987 |
| JP | 2000-022869 | 1/2000 |
| JP | 2002-288670 A | 10/2002 |
| JP | 2003-263639 A | 9/2003 |
| JP | 2005-043286 A | 2/2005 |
| JP | 2002-083298 A | 10/2009 |

OTHER PUBLICATIONS

English translation of Japanese Patent Office, Office Action issued for Patent Application JP2007-316896, Aug. 20, 2009, pp. 1-4.*
Japanese Patent Office, Office Action issued in Patent Application JP2007-316896, on Aug. 20, 2009.

* cited by examiner

*Primary Examiner*—Brian P Werner
(74) *Attorney, Agent, or Firm*—Sonnenschein Nath & Rosenthal LLP

(57) ABSTRACT

A registration apparatus includes a corresponding pixel detection unit that detects two or more than two pixels in an object of identification shown in a first image obtained by shooting the object of identification at a site of a living body from a first position and corresponding two or more than two pixels, whichever appropriate, in the object of identification shown in a second image obtained by shooting the object of identification from a second position different from the first position and located substantially on a plane including the first position, an inclination detection unit that detects the extent of inclination of the site of the living body relative to a reference plane on the basis of the difference of each corresponding pair of pixels, a correction unit that corrects the distortion of the first image or the second image according to the extent of inclination and a registration unit that registers the object of identification shown in the first image or the second image corrected for the distortion in a recording medium.

10 Claims, 12 Drawing Sheets

REGISTRATION APPARATUS, COLLATION APPARATUS, IMAGE CORRECTION METHOD AND PROGRAM

CROSS REFERENCE TO RELATED APPLICATION

The present invention contains subject matter related to Japanese Patent Application JP2005-316896 filed in the Japanese Patent Office on Oct. 31, 2005, the entire contents of which being incorporated herein by reference.

BACKGROUND OF THE INVENTION

1. Field of the Invention

The present invention relates to a registration apparatus, a collation apparatus, an image correction method and a program that can suitably be used in applications for biometric authentications.

2. Description of the Related Art

Blood vessels have been objects of biometrics authentication among others. Generally, authentication apparatus include an image pickup camera and a finger is typically rigidly secured in position in parallel with the imaging plane of the image pickup camera in order for the camera to shoot blood vessels in the finger. The authentication apparatus then registers the image of the blood vessels obtained as a result of the shooting operation in a memory or the like or compares the image with the image of blood vessels registered in a memory or the like to identify the person to be identified.

However, when shooting blood vessels in a finger, it is neither convenient nor comfortable for the person to be identified to rigidly secure the finger on the image pickup camera. In other words, there is a demand for arrangements allowing the person to place a finger on an image pickup camera without restrictions from the viewpoint of user friendliness.

On the other hand, when an image pickup camera shoots blood vessels placed on the camera without restrictions, the condition in which the finger was placed on the camera when the image of the blood vessels was registered and the condition in which the finger is placed on the camera for authentication can highly probably be different from each other.

In practical applications, one of the typical instances where the condition of a finger differs between at the time of registration and at the time of authentication is the angle between the imaging plane of the image pickup camera and the finger placed on the camera, or the inclination of the finger relative to the imaging plane.

When an image of blood vessels of a finger is picked up in a condition where the finger is inclined relative to the imaging plane of the camera, the finger in the image picked up for the blood vessels shows a profile that is long at a part located close to the image pickup camera and short at a part located remote from the image pickup camera. In short, the picked up image of the finger is distorted.

If the distortion of the finger in an image thereof (distortion of projection) differs between the time of registration and the time of authentication, there can arise a case where the finger is that of a registered (authorized) person but determined to be that of an unauthorized (unregistered) person and a case where the finger is that of an unauthorized (unregistered) person but determined to be that of a registered (authorized) person. In short, the accuracy of authentication will be poor.

To dissolve the problem of distortion of projection, there are known techniques of correcting an image of an object to be authenticated by making the length of the part of a profile thereof located closer match the length of the part of the profile located nearer to the image pickup camera or vice versa (see, for example, Jpn. Pat. Appln. Laid-Open Publication No. 2000-22869 (FIGS. 11 and 12).

SUMMARY OF THE INVENTION

However, if any of such known techniques is applied to an authentication apparatus for the purpose of dissolving the problem of distortion of projection, it is not possible for the authentication apparatus to discriminate the distortion of projection, if any, that appears in the image to be examined and is attributable to an inclination of the finger to be authenticated relative to the camera that picked up the image and the distortion of projection, if any, that appears in the image and is attributable to the profile of the finger itself.

Therefore, if such a technique is applied to an authentication apparatus and the distortion of projection is attributable to the profile of the finger itself to be authenticated, the authentication apparatus erroneously correct the image, judging the distortion of projection to be attributable to an inclination of the finger relative to the camera that picked up the image. Then, the problem of a poor accuracy of authentication remains undissolved.

In view of the above-identified problem, it is desirable to provide a registration apparatus, a collation apparatus, an image correction method and a program that can improve the accuracy of authentication.

According to an aspect of the present invention, there is provided a registration apparatus including: a corresponding pixel detection means for detecting two or more than two pixels in an object of identification shown in a first image obtained by shooting the object of identification at a site of a living body from a first position and corresponding two or more than two pixels, whichever appropriate, in the object of identification shown in a second image obtained by shooting the object of identification from a second position different from the first position and located substantially on a plane including the first position; an inclination detection means for detecting the extent of inclination of the site of the living body relative to a reference plane on the basis of the difference of each corresponding pair of pixels; a correction means for correcting the distortion of the first image or the second image according to the extent of inclination; and a registration means for registering the object of identification shown in the first image or the second image corrected for the distortion in a recording medium.

Thus, with a registration apparatus according to the aspect of the present invention as defined above, it is possible to know the real angle of inclination of the finger of which an image is picked up. In other words, there does not arise a situation where the image is erroneously corrected by judging the distortion of projection to be attributable not to the profile of the finger itself but to the inclination of the finger relative to the camera that picked up the image. Therefore, with a registration apparatus according to the aspect of the present invention, it is possible to register an object of identification, which may be a finger, after selectively removing the distortion of projection attributable to the change in the condition of placement of the finger without relying on the profile of the finger. Then, it is possible to improve the accuracy of authentication at the time of collation.

According to another aspect of the present invention, there is provided a collation apparatus including: a corresponding pixel detection means for detecting two or more than two pixels in an object of identification shown in a first image obtained by shooting the object of identification at a site of a living body from a first position and corresponding two or more than two pixels, whichever appropriate, in the object of identification shown in a second image obtained by shooting the object of identification from a second position different from the first position and located substantially on a plane including the first position; an inclination detection means for detecting the extent of inclination of the site of the living body relative to a reference plane on the basis of the difference of each corresponding pair of pixels; a correction means for correcting the distortion of the first image or the second image according to the extent of inclination; and a collation means for collating, using the object of identification shown in the first image or the second image corrected for the distortion as object of collation.

Thus, with a collation apparatus according to the aspect of the present invention as defined above, it is possible to know the real angle of inclination of the finger of which an image is picked up. In other words, there does not arise a situation where the image is erroneously corrected by judging the distortion of projection to be attributable not to the profile of the finger itself but to the inclination of the finger relative to the camera that picked up the image. Therefore, with a collation apparatus according to the aspect of the present invention, it is possible to collate, using the object of identification, which may be a finger, after selectively removing the distortion of projection attributable to the change in the condition of placement of the finger without relying on the profile of the finger. Then, it is possible to improve the accuracy of authentication.

According to still another aspect of the present invention, there is provided an image correction method including: a first step of acquiring a first image obtained by shooting an object of identification at a site of a living body from a first position and a second image obtained by shooting the object of identification from a second position different from the first position and located substantially on a plane including the first position; a second step of detecting two or more than two pixels in the object of identification shown in the first image and corresponding two or more than two pixels, whichever appropriate, in the object of identification shown in the second image; a third step of detecting the extent of inclination of the site of the living body relative to a reference plane on the basis of the difference of each corresponding pair of pixels; and a fourth step of correcting the distortion of the first image or the second image according to the extent of inclination.

Thus, with an image correction method according to the aspect of the present invention as defined above, it is possible to know the real angle of inclination of the finger of which an image is picked up. In other words, there does not arise a situation where the image is erroneously corrected by judging the distortion of projection to be attributable not to the profile of the finger itself but to the inclination of the finger relative to the camera that picked up the image. Therefore, with an image correction method according to the aspect of the present invention, it is possible to have an operation of biometrics authentication of an object of identification, which may be a finger, performed after selectively removing the distortion of projection attributable to the change in the condition of placement of the finger without relying on the profile of the finger. Then, it is possible to improve the accuracy of authentication.

According to still another aspect of the present invention, there is provided a program for causing a computer to execute: a first process of detecting two or more than two pixels in an object of identification shown in a first image obtained by shooting the object of identification at a site of a living body from a first position and two or more than two corresponding pixels, whichever appropriate, in the object of identification shown in a second image obtained by shooting the object of identification from a second position different from the first position and located substantially on a plane including the first position; a second process of detecting the extent of inclination of the site of the living body relative to a reference plane on the basis of the difference of each corresponding pair of pixels; and a third process of correcting the distortion of the first image or the second image according to the extent of inclination.

Thus, with a program according to the aspect of the present invention as defined above, it is possible to know the real angle of inclination of the finger of which an image is picked up. In other words, there does not arise a situation where the image is erroneously corrected by judging the distortion of projection to be attributable not to the profile of the finger itself but to the inclination of the finger relative to the camera that picked up the image. Therefore, with a program according to the aspect of the present invention, it is possible to have an operation of biometric authentication of an object of identification, which may be a finger, performed after selectively removing the distortion of projection attributable to the change in the condition of placement of the finger without relying on the profile of the finger. Then, it is possible to improve the accuracy of authentication.

According to the present invention, it is possible to realize a registration apparatus, a collation apparatus, an image correction method and a program with an improved accuracy of authentication because it is possible to have an operation of biometrics authentication of an object of identification, which may be a finger, performed after selectively removing the distortion of projection attributable to the change in the condition of placement of the finger without relying on the profile of the finger by detecting two or more than two pixels in an object of identification shown in a first image obtained by shooting the object of identification at a site of a living body from a first position and two or more than two corresponding pixels, whichever appropriate, in the object of identification shown in a second image obtained by shooting the object of identification from a second position different from the first position and located substantially on a plane including the first position, detecting the extent of inclination of the site of the living body relative to a reference plane on the basis of the difference of each corresponding pair of pixels and correcting the distortion of the first image or the second image according to the extent of inclination. Then, it is possible to improve the accuracy of authentication.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

Now, embodiments of the present invention will be described in greater detail by referring to the accompanying drawings.

Figure 1:
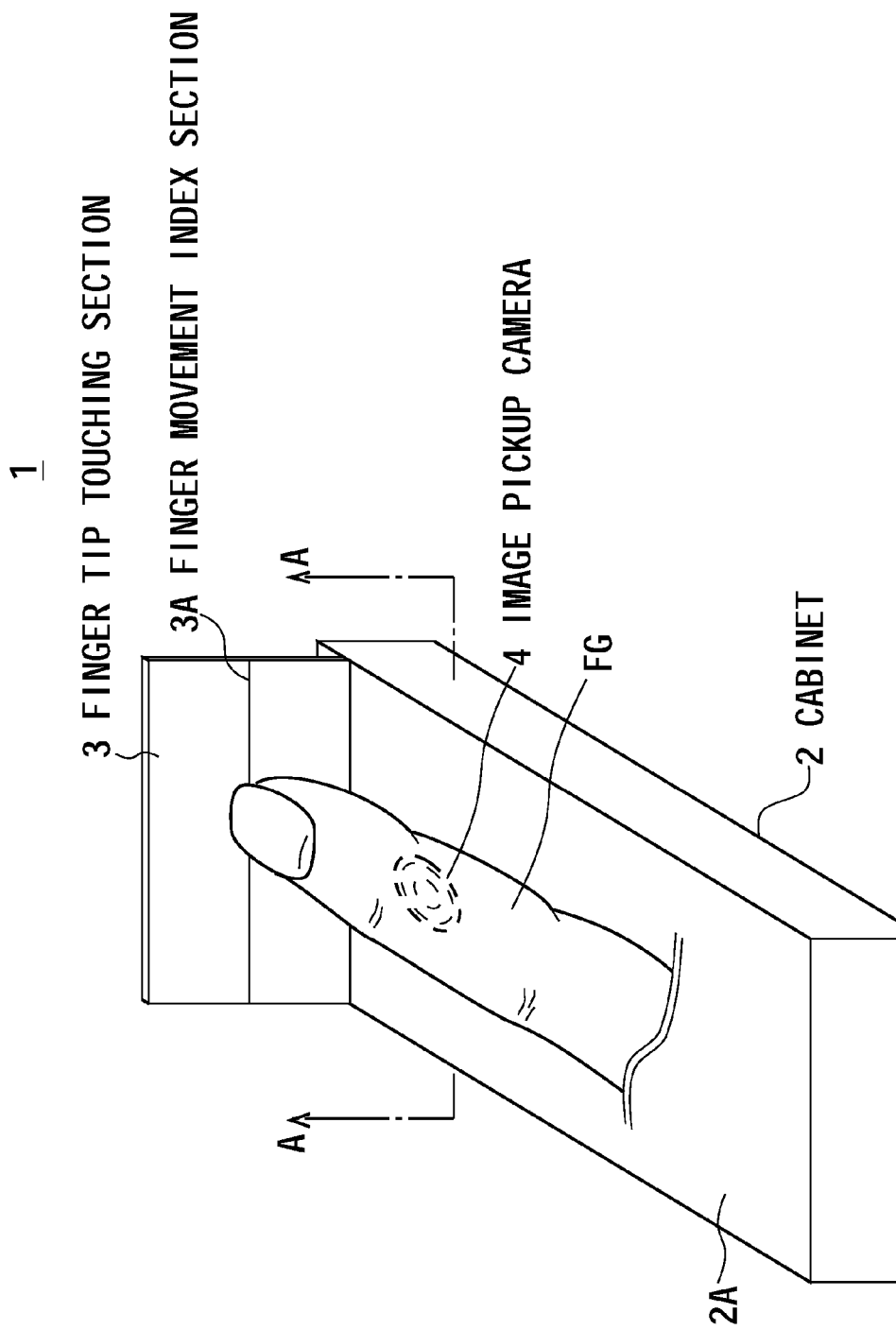
FIG. 1 is a schematic perspective view of an authentication apparatus, showing an appearance thereof.
Figure 2:
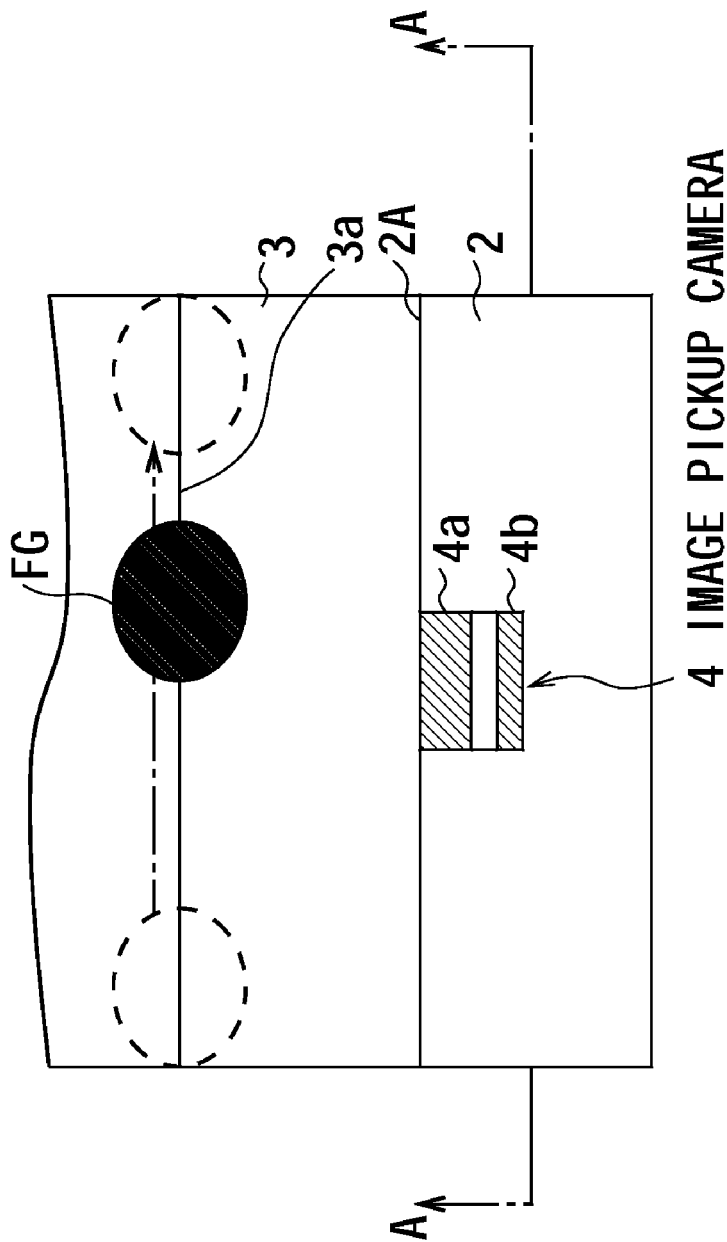
FIG. 2 is a schematic cross sectional view of the authentication apparatus taken along line A-A' in FIG. 1.

(1) Appearance of Authentication Apparatus Realized by Applying an Embodiment of the Invention FIG. 1 is a schematic perspective view of an authentication apparatus realized by applying an embodiment of the present invention, showing an appearance thereof, and FIG. 2 is a schematic cross sectional view of the authentication apparatus taken along line A-A' in FIG. 1. Referring to FIGS. 1 and 2, 1 generally denotes the authentication apparatus realized by applying this embodiment. An image pickup camera 4 and a near infrared (IR) source (not shown) for irradiating infrared rays that are specifically absorbed by hemoglobin of living bodies into the image pickup space of the image pickup camera 4 are provided at respective predetermined positions on the top surface 2A of a substantially box-shaped cabinet 2.

With the authentication apparatus 1, when a finger FG is placed in the image pickup space, near infrared rays emitted onto the finger FG are absorbed by hemoglobin of the blood vessel tissues found in the finger FG and reflected and scattered by the tissues other than the blood vessel tissues of the finger FG. Thus, near infrared rays projected onto the profile and some of the blood vessels of the finger FG (to be referred to as finger-profile/blood-vessels-projected rays hereinafter) enter the image pickup camera 4 by way of the finger FG.

The image pickup camera 4 is adapted to lead the finger-profile/blood-vessels-projected rays that enters it to an image pickup element 4b by way of an optical system 4a and output a video signal representing images of the profile and some of the blood vessels of the finger FG formed in the image pickup element 4b (to be referred to as finger-profile/blood-vessels video signal hereinafter) to a signal processing circuit mounted in the authentication apparatus 1.

In this way, the authentication apparatus 1 can pick up images of some of the blood vessels found in the finger FG.

In the instance of this embodiment, a thin member that the finger tip touches (to be referred to as finger tip touching section hereinafter) 3 is arranged in a condition of becoming perpendicular relative to the top surface 2A and a linear member operating as index for moving the finger FG on a same plane in the image pickup space of the image pickup camera 4 (to be referred to as finger movement index section hereinafter) 3a is arranged on the finger tip touching surface of the finger tip touching section 3. With the authentication apparatus 1, the finger FG is adapted to move in a predetermined direction (as indicated by a dotted chain line in FIG. 2) along the finger movement index section 3a.

Thus, with the authentication apparatus 1, it is possible to successively pick up images of some of the blood vessels found in the finger FG that moves on a same plane.

Note that near infrared rays with a wavelength range between 700 nm and 900 nm that both deoxygenated hemoglobin and oxygenated hemoglobin specifically absorb are emitted by this authentication apparatus 1.

With this arrangement, the authentication apparatus 1 can faithfully pick up images of blood vessels at an end of (a finger of) a living body where veins and arteries coexist in a mixed state.

Figure 3:
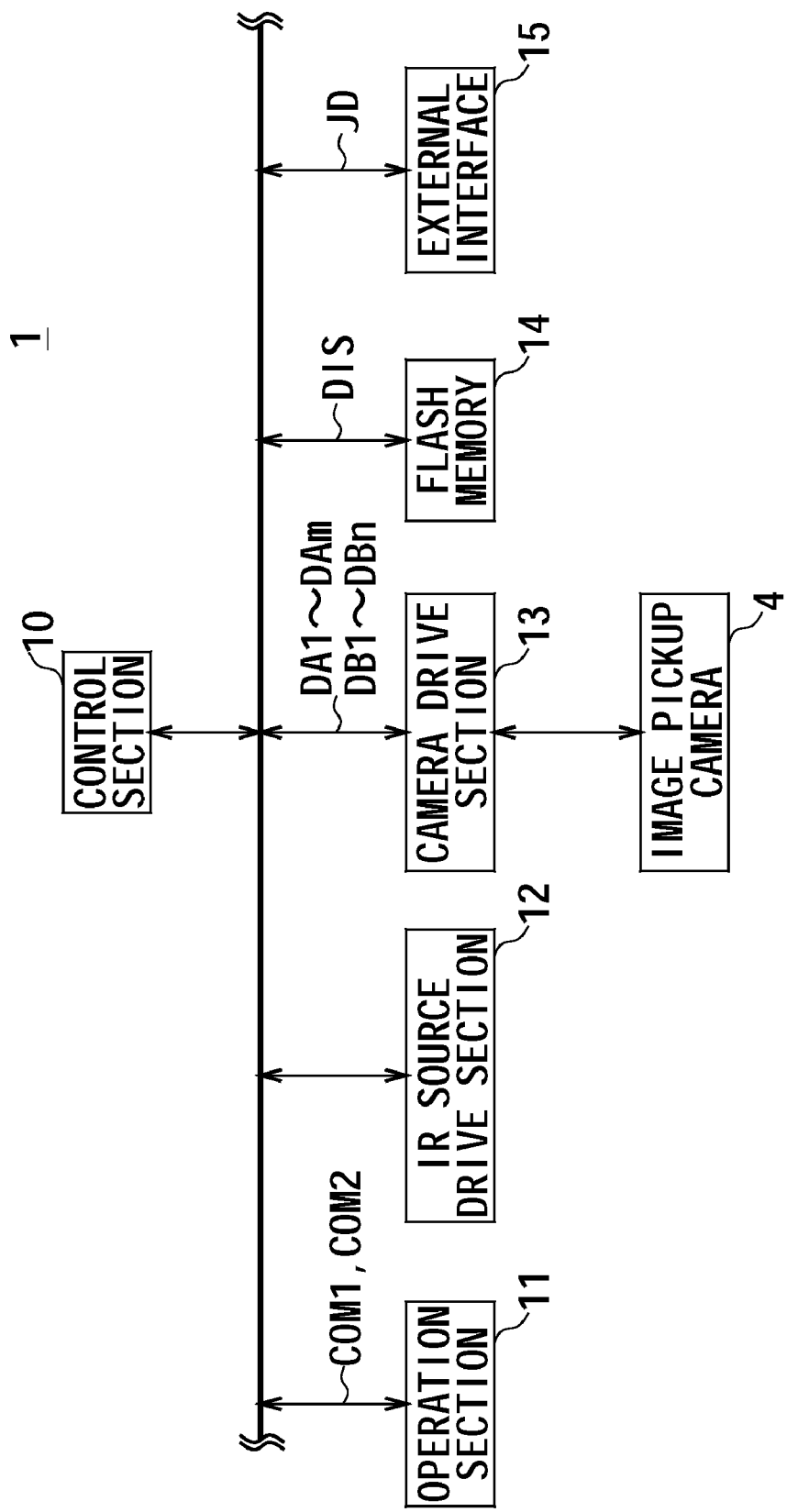
FIG. 3 is a schematic block diagram of the authentication apparatus of FIG. 1, showing the circuit configuration thereof.

(2) Circuit Configuration of Authentication Apparatus Realized by Applying this Embodiment of the Invention FIG. 3 is a schematic block diagram of the authentication apparatus of FIG. 1, showing the circuit configuration thereof. Referring to FIG. 3, the authentication apparatus 1 includes an operation section 11, an IR source drive section 12, a camera drive section 13, a flash memory 14 and an interface 15 for exchanging data with the outside of the apparatus (to be referred to as external interface hereinafter), which are connected to a control section 10 by way of transmission lines.

The control section 10 is a computer that includes a Central Processing Unit (CPU) for controlling the entire authentication apparatus 1, a Read Only Memory (ROM) for storing various programs and presetting information, a Random Access Memory (RAM) that is a work memory of the CPU. The control section 10 is adapted to receive an execution command COM1 for an operation in a mode of registering blood vessels of a person (to be referred to as blood vessel registration mode hereinafter) or an execution command COM2 for an operation in a mode of judging identity of a registered person (to be referred to as authentication mode hereinafter) from the operation section 11 according to a user operation.

The control section 10 decides the mode of operation according to an execution command COM1 or an execution command COM2 and executes a registration process or an authentication process, using a program that corresponds to the decision and appropriately controlling the IR source drive section 12, the camera drive section 13, the flash memory 14 and the external interface 15.

When the control section 10 decides to operate in a blood vessel registration mode, it shifts the operation mode to a blood vessel registration mode and acquires video data including those of some of the blood vessels of the finger FG that is moving in the image pickup space, while the finger tip is held in contact with the finger movement index section 3a (FIGS. 1 and 2).

More specifically, the control section 10 drives the near IR source (not shown) by way of the IR source drive section 12 to turn on the near IR source. Then, as a result, near IR rays are emitted onto the finger FG that is moving in the image pickup space and finger-profile/blood-vessels-projected rays obtained by way of the finger FG enter the image pickup element 4b (FIG. 2) by way of the optical system 4a (FIG. 2) of the image pickup camera 4. Then, the finger-profile/blood-vessels-projected rays that enter the image pickup element 4b are subjected to photoelectric conversion.

Additionally, the control section 10 adjusts the lens position of the focusing lens of the optical system 4a through the camera drive section 13 so as to focus the finger located in the image pickup space or some of the blood vessels in the finger according to the contrast of the finger-profile/blood-vessels video signal output from the image pickup element 4b as a result of the photoelectric conversion.

Then, the control section 10 acquires the finger-profile/blood-vessels video signal output from the image pickup element 4b of the image pickup camera 4 after the adjustment of the lens position as data (to be referred to as finger-profile/blood-vessels video data hereinafter) DA1, DA2, . . . , DAm (m=integer).

In this condition, the control section 10 is adapted to detect the inclination of the finger on the basis of the finger-profile/blood-vessels video data DA1 through DAm and executes a process for correcting the distortion of projection (to be referred to as distortion correction process hereinafter) on, for example, the finger-profile/blood-vessels video data DA1 out of the finger-profile/blood-vessels video data DA1 through DAm depending on the inclination of the finger. Then, the control section 10 registers the finger-profile/blood-vessels video data that have been subjected to the distortion correction process as data DIS for identifying the living body whose finger FG is arranged and moving in the image pickup space (to be referred to as identification information hereinafter) by storing them in the flash memory 14.

In this way, the control section 10 operates in a blood vessel registration mode.

When, on the other hand, the control section 10 decides to operate in an authentication mode, it shifts the operation mode to an authentication mode and acquires finger-profile/blood-vessels video data DB1, DB2, . . . , DBn (n=integer) including those of some of the blood vessels of the finger FG that is moving in the image pickup space, while the finger tip is held in contact with the finger movement index section 3a (FIGS. 1 and 2), as in the case of the above-described blood vessel registration mode. On the basis of the finger-profile/blood-vessel video data DB1 to DBn, a distortion correction process is executed as in the case of the blood vessel registration mode.

In this condition, the control section 10 is adapted to collate the finger-profile/blood-vessels video data that have been subjected to a distortion correction process and the identification information DIS registered in the flash memory 14 and judges if the user, or the object of the image pickup operation of the image pickup camera 4, is the registered person (authorized person) or not. Then, the control section 10 transfers the outcome of judgment as judgment data JD to the outside by way of the external interface 15.

In this way, the control section 10 operates in an authentication mode.

(3) Specific Description of Distortion Correction Process

Now, the distortion correction process that the control section 10 executes will be specifically described below in detail. Since the distortion correction process that is executed in a blood vessel registration mode and the distortion correction process that is executed in an authentication mode are similar to each other, the distortion correction process in a blood vessel registration mode will be specifically described here from the viewpoint of convenience of description.

(3-1) Detection of Corresponding Pixels as Object of Attentions

Figure 4A:
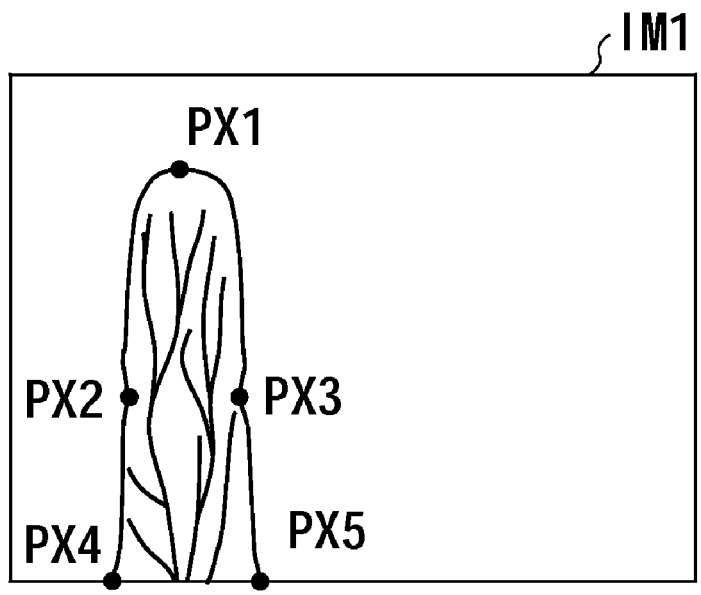
FIGS. 4A and 4B are schematic illustrations of detection of corresponding pixels.

Firstly, the control section 10 selects the finger-profile/blood-vessels image IM1 (FIG. 4A) of the finger-profile/blood-vessels video data DA1 it acquired first and the finger-profile/blood-vessels image IM2 (FIG. 4B) of the finger-profile/blood-vessels video data DAm it acquired last out of the finger-profile/blood-vessels video data DA1 through DAm it acquired from the image pickup camera 4 as object to be processed.

Since the finger FG that is the object of the image pickup operation moves in the image pickup space, while the finger tip is held in contact with the finger movement index section 3a (FIGS. 1 and 2), the scope of the image pickup operation remains same but the image pickup position varies. Therefore, as clearly seen from FIG. 4, while the finger profile and the blood vessels shown in the finger-profile/blood-vessels image IM1 are same as those shown in the finger-profile/blood-vessels image IM2, the positions of the former in the image differ from those of the latter.

Figure 4B:
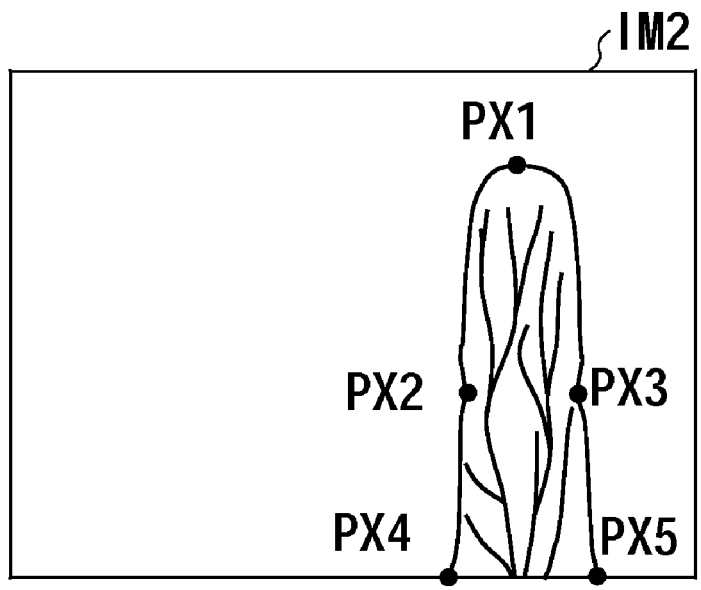

Thus, the control section 10 detects two or more than two characteristic pixels from the pixels showing the finger profile and the blood vessels in the finger-profile/blood-vessels image IM1 (FIG. 4A) and two or more than two, whichever appropriate, characteristic corresponding pixels showing the finger profile and the blood vessel in the finger-profile/blood-vessels image IM2 (FIG. 4B).

More specifically, the control section 10 executes a process for emphasizing the profile on the finger-profile/blood-vessels video data DA1 and the finger-profile/blood-vessels video data DAm and collates the finger-profile/blood-vessels images IM1 and IM2 obtained as a result of the processes. Then, the control section 10 detects, for example, corresponding pixels PX1 and PX1', PX2 and PX2', PX3 and PX3', PX4 and PX4' and PX5 and PX5' of the first joint and the second joint of the finger tip out of the group of pixels showing the finger profile.

(3-2) Detection of Inclination

Figure 5:
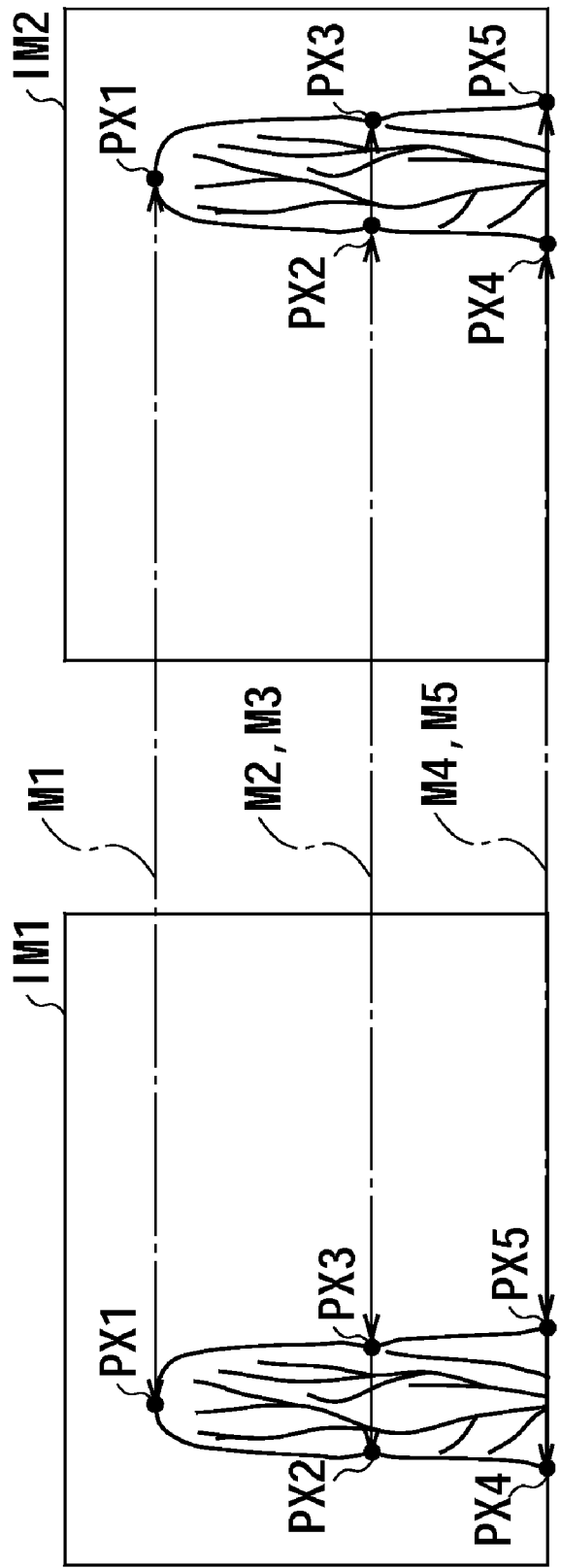
FIG. 5 is a schematic illustration of the difference of corresponding pixels.

Then, as shown in FIG. 5, the control section 10 detects the actual inclination of the finger on the basis of the positional differences (to be referred to as corresponding pixel differences hereinafter) M1, M2, M3, M4, M5 between the corresponding pixels PX1 and PX1', PX2 and PX2', PX3 and PX3', PX4 and PX4' and PX5 and PX5'.

Figure 6:
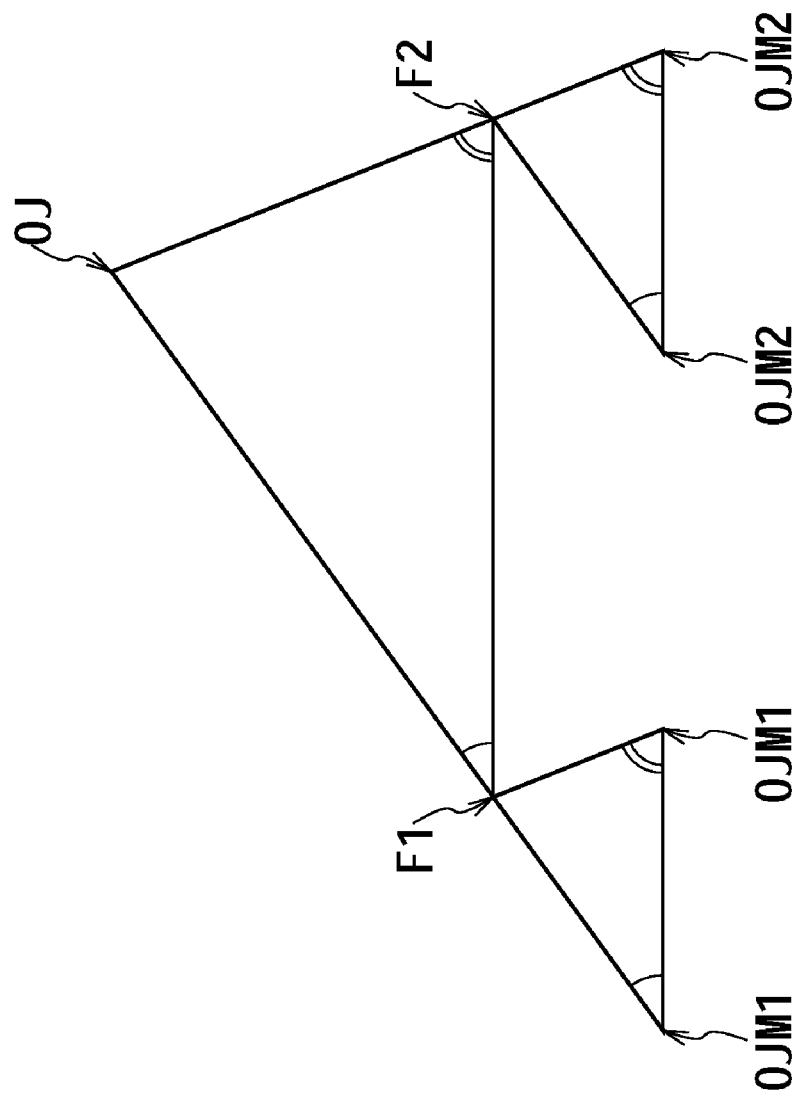
FIG. 6 is a schematic illustration of a stereoscopic viewing technique.

A stereoscopic viewing technique is used for detecting the corresponding pixel differences. With the stereoscopic viewing technique, when images of an object of shooting OJ is picked up from two positions that allow the optical axes of the lens of the image pickup camera to be held in parallel with each other as shown in FIG. 6, (1) "the relationship between the object of shooting OJ and the focal points F1, F2 relative to the object of shooting OJ", (2) the relationship among one of the focal points, or the focal point F1, the position of the object of shooting OJM1 that is actually focused at the imaging plane of the camera and the virtual position of the object of shooting OJM1' that would be focused at the imaging plane if viewed from the other position" and (3) "the relationship among the other focal point, or the focal point F2, the position of the object of shooting OJM2 that is actually focused at the imaging plane of the camera and the virtual position of the object of shooting OJM2' that would be focused at the imaging plane if viewed from the former position" are similar relative to each other.

Figure 7:
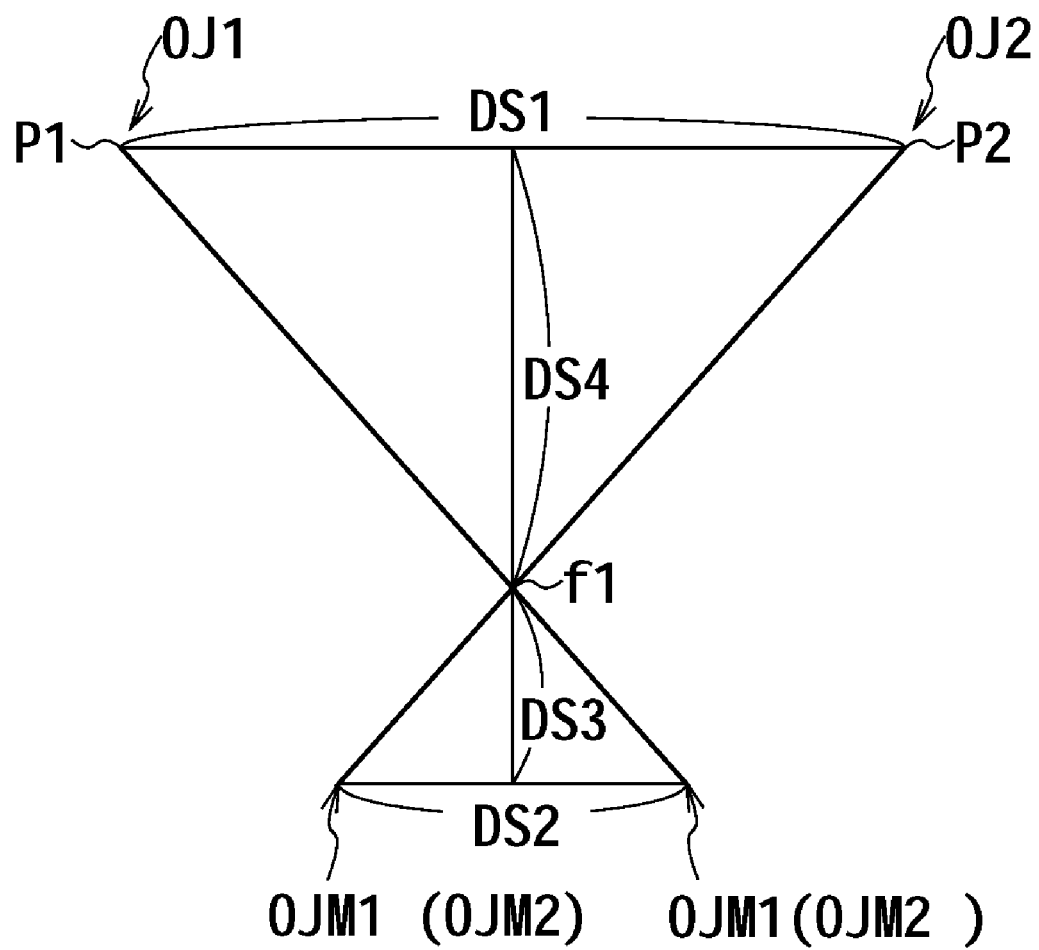
FIG. 7 is a schematic illustration of the relationship (1) between a moving finger, focal point and parallax.

Although the authentication apparatus 1 does not have two cameras mounted therein, a relationship of similarity as shown in FIG. 7 holds true because the finger FG that is the object of shooting OJ is moving (FIG. 2, etc.). Note that the parts in FIG. 7 that correspond to those in FIG. 6 are denoted respectively by the same reference symbols. The distance between the two cameras in FIG. 6 corresponds to the distance DS1 from the position of placement P1 of the finger FG that corresponds to the finger-profile/blood-vessels image IM1 (FIG. 4A) to the position of placement P2 of the finger FG that corresponds to the finger-profile/blood-vessels image IM2 (FIG. 4B).

Additionally, the distance DS2 between the position of the object of shooting OJM1 and the virtual position of the object of shooting OJM1' corresponds to the corresponding pixel differences M (FIG. 5: M1, M2, M3, M4, M5), or the parallax.

Therefore, if the distance DS1 from the position of placement P1 to the position of placement P2 is "H" and the distance DS2 (parallax) between the position of the object of shooting (OJM1) and the virtual position of the object of shooting (OJM1') is "Z", while the distance DS3 from the focal point F1 of the image pickup camera 4 to the imaging plane is "f" and the distance DS4 from the finger FG (object of shooting OJ) to the focal point f1 of the image pickup camera 4 is "PD", the relationship of similarity shown in FIG. 7 is expressed by formula (1) shown below.

$$PD = H \cdot f/Z \quad (1)$$

Figure 8:
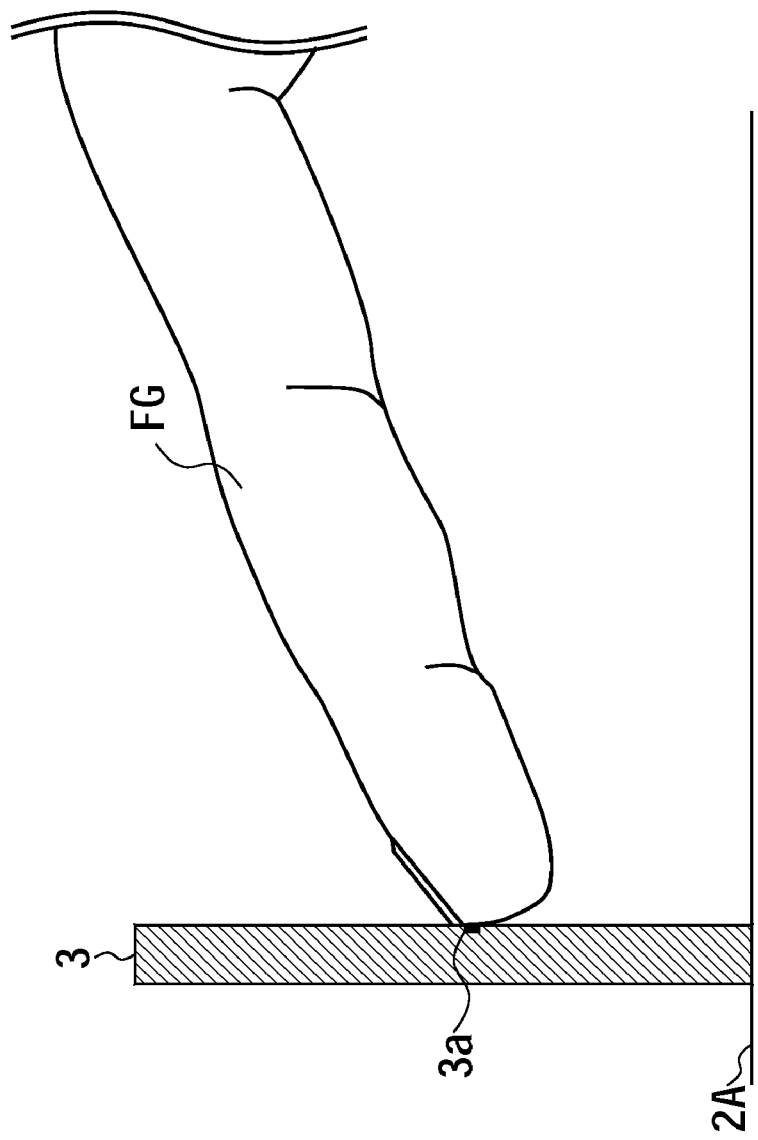
FIG. 8 is a schematic illustration of an inclination of a finger relative to a reference plane.
Figure 9:
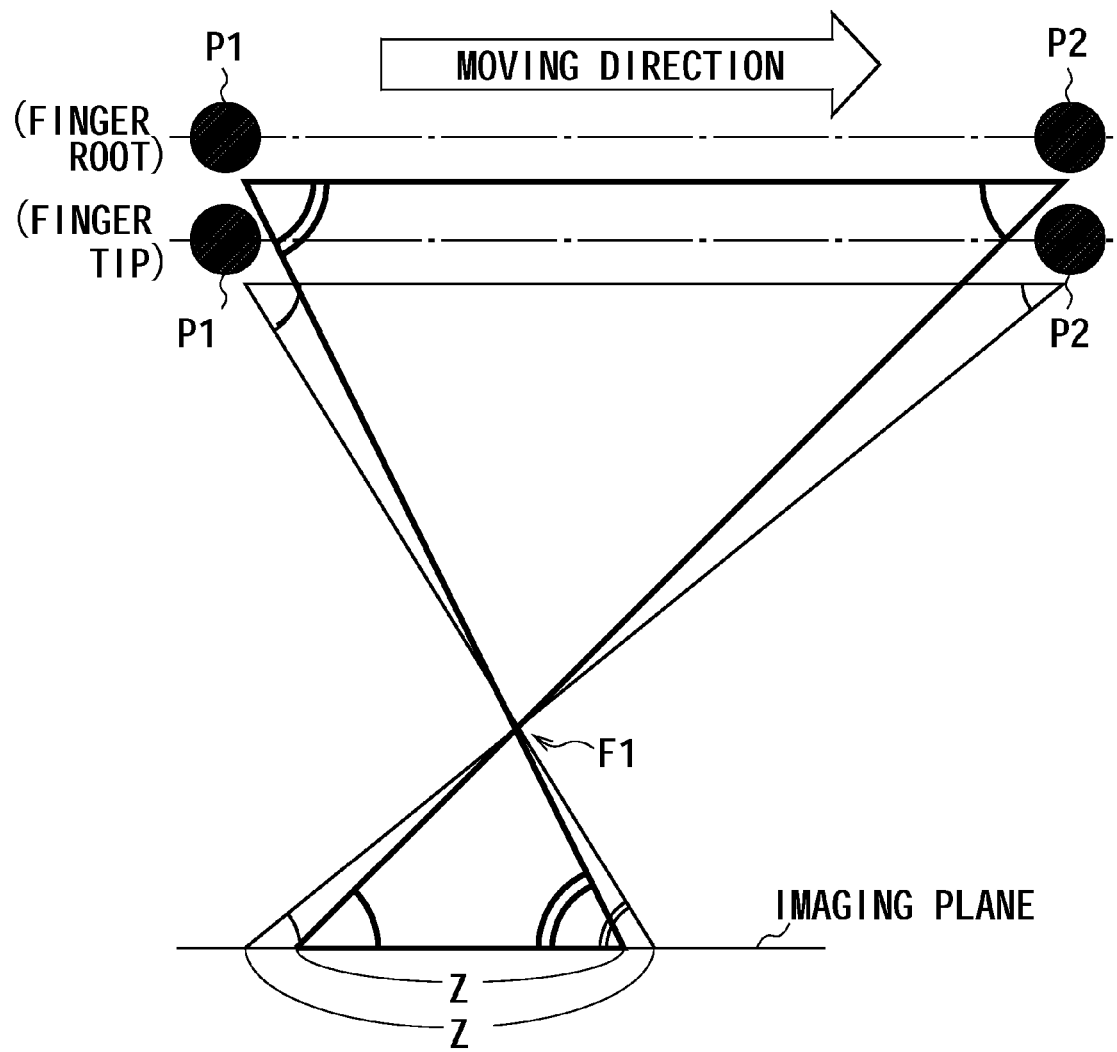
FIG. 9 is a schematic illustration the relationship (2) between a moving finger, focal point and parallax.

If the finger FG that is inclined and more remote at the tip thereof than at the root thereof is moved along the finger movement index section 3a as shown in FIG. 8, the relationship among the positions of placement P1' and P2' at respective given clock times, the focal point f1 and the parallax Z' (as indicated by the thick solid lines in FIG. 9) and the relationship among the positions of placement P1" and P2" at respective given clock times, the focal point f1 and the parallax Z" (as indicated by the thin solid lines in FIG. 9) are similar relative to each other as shown in FIG. 9.

Thus, if "H (the distance from the position of placement P1 to the position of placement P2)" and "PD (the distance from the finger FG (object of shooting OJ) to the focal point f1 of the image pickup camera 4)" are not known, it is possible to judge if the finger is inclined or not so long as the parallax Z' at the root of the finger and the parallax Z" at the tip of the finger and hence the ratio thereof are known.

Figure 10A:
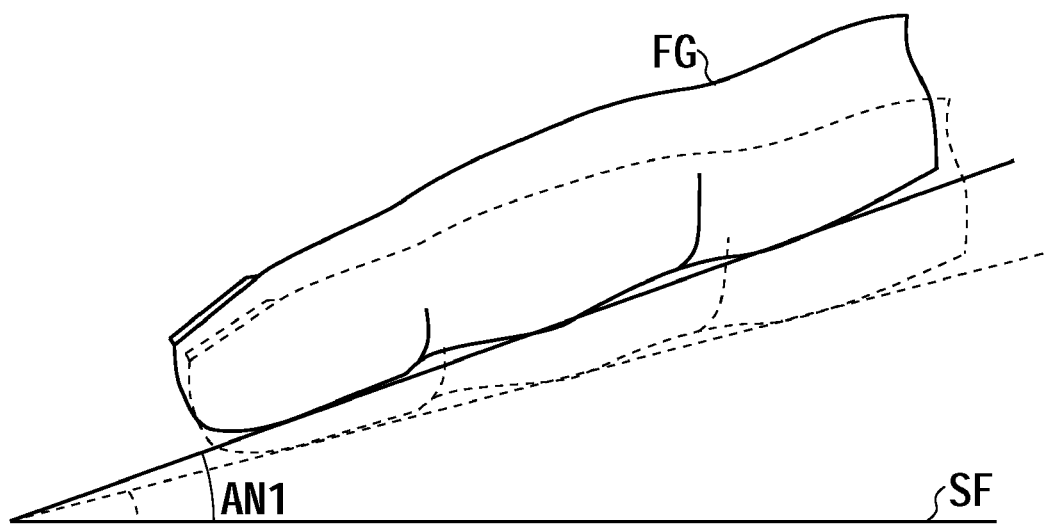
FIGS. 10A and 10B are schematic illustrations of detection of inclination and rotation of a finger.
Figure 10B:
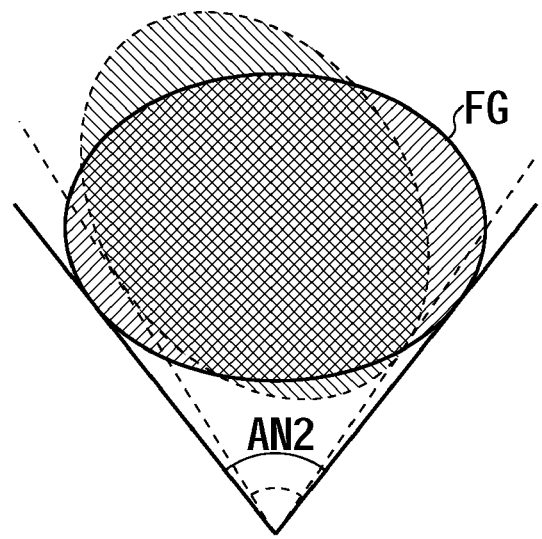

Therefore, the control section 10 determines the ratios of the corresponding pixel differences M1 through M5 (M1/M2, M1/M3, M1/M4, M1/M5, M2/M3, M2/M4, M2/M5, M3/M4, M3/M5 and M4/M5) and, as shown in FIGS. 10A and 10B, detects the extent of inclination AN1 (FIG. 10A) of the finger FG relative to the reference plane located vis-à-vis the pad of the finger FG (to be referred to as finger inclination angle hereinafter) and the extent of rotation AN2 (FIG. 10B) of the finger FG (to be referred to finger rotary angle hereinafter). Note that, in the case of this embodiment, the reference plane is the imaging plane of the image pickup camera 4 or the top surface 2A of the cabinet 2.

(3-3) Correction of Distortion

Thereafter, the control section 10 corrects the distortion of the finger-profile/blood-vessels image IM1 (or the finger-profile/blood-vessels image IM2) according to the outcome of the detection to correct the image in order to make it an image of the finger FG picked up when the surface of the finger pad is parallel to the reference plane.

In this way, the control section 10 can execute a distortion correction process on the basis of the finger-profile/blood-vessels image IM1 (FIG. 4A) and the finger-profile/blood-vessels image IM2 (FIG. 4B) acquired from the image pickup camera 4.

(3-4) Distortion Correction Process Sequence

Figure 11:
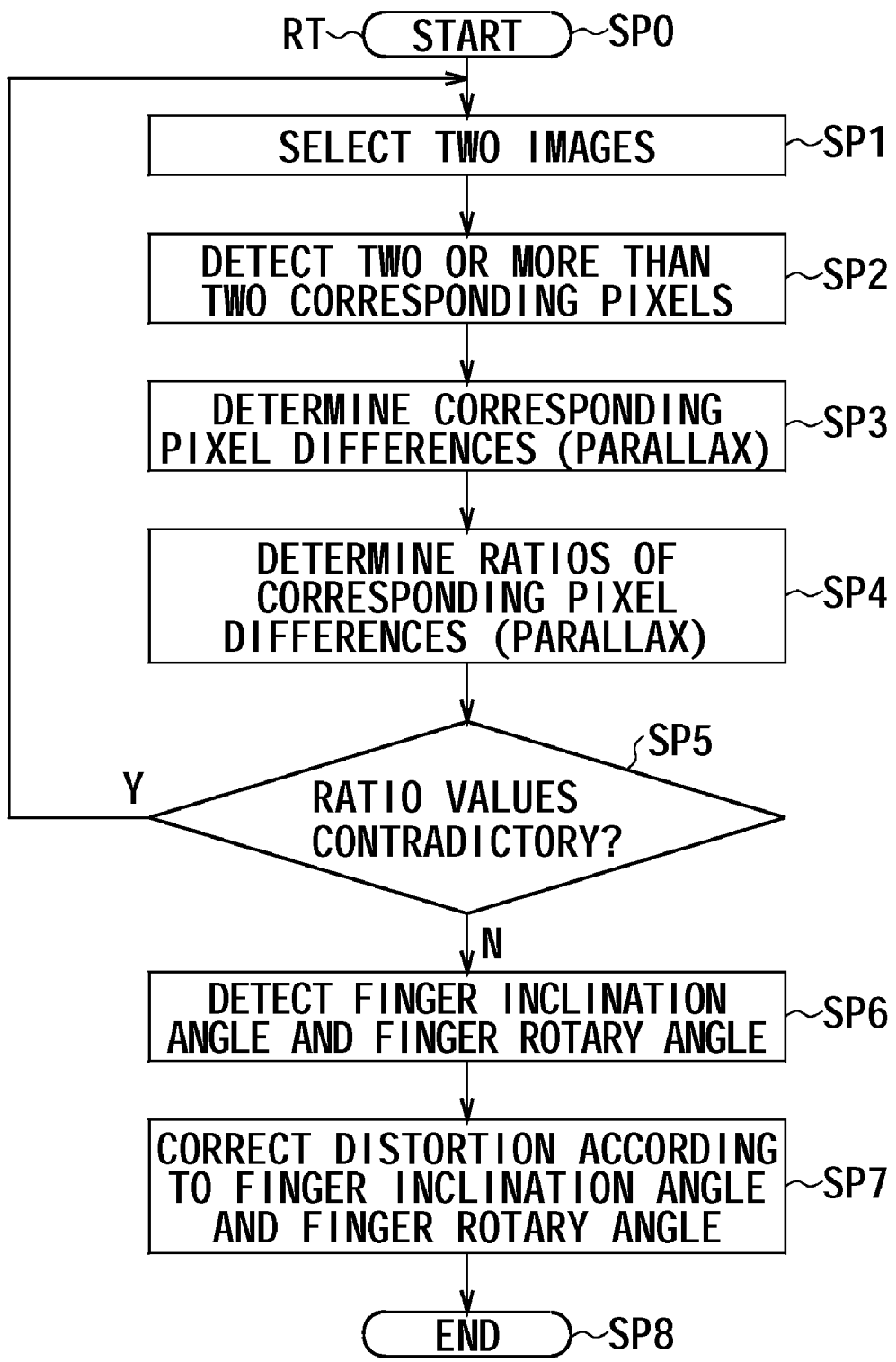
FIG. 11 is a flowchart of a distortion correction process sequence.

The above-described distortion correction process of the control section 10 is executed by following the distortion correction process sequence RT illustrated in FIG. 11.

More specifically, as an image pickup operation is started, the control section 10 starts following the distortion correction process sequence at Step SP0 and, in the next step, or Step SP1, selects finger-profile/blood-vessels image data, e.g., the finger-profile/blood-vessels image data DA1 and DAm (FIG. 4), out of the finger-profile/blood-vessels image data DA1 through DAm obtained as a result of the operation of shooting the finger FG that is moving in the image pickup space, while the finger tip is held in contact with the movement index section 3a (FIGS. 1 and 2).

In the next step, or Step SP2, the control section 10 detects the corresponding pixels PX1 and PX1', PX2 and PX2', PX3 and PX3', PX4 and PX4' and PX5 and PX5' (FIG. 5) from the finger-profile/blood-vessels images IM1, IM2 of the selected finger-profile/blood-vessels video data DA1 and DAm.

Then, in the next step, or Step SP3, the control section 10 determines the differences M1 through M5 (FIG. 5) of the corresponding pixels that correspond to the parallax from the corresponding pixels PX and PX' and, in the next step, of Step SP4, determines the ratios of the corresponding pixel differences M1 through M5 (M1/M2, M1/M3, M1/M4, M1/M5, M2/M3, M2/M4, M2/M5, M3/M4, M3/M5 and M4/M5) before it proceeds to Step SP5.

In Step SP5, the control section 10 judges if any two of more than two of the values of the ratios of the corresponding pixel differences M1 through M5 as determined in Step SP4 are contradictory or not. If any two of more than two of the values are contradictory, the control section 10 returns to Step SP1 and selects two finger-profile/blood-vessels video data that are different from the finger-profile/blood-vessels video data DA1 and DAm and repeats the above-described process.

If, on the other hand, any two or more than two of the values of the ratios of the corresponding pixel differences M1 through M5 are not contradictory, the control section 10 proceeds to Step SP6, where it detects the finger inclination angle AN1 (FIG. 10A) and the finger rotary angle AN2 (FIG. 10B) and then to Step S7, where it corrects the distortion of the finger-profile/blood-vessels image IM1 (or the finger-profile/blood-vessels image IM2) so as to turn the image into an image of the finger FG picked up when the surface of the finger pad is parallel to the reference plane according to the outcome of the detection. Then, the control section 10 proceeds to Step SP8 to end the distortion correction process sequence RT.

In this way, the control section 10 can execute the distortion correction process by following the distortion correction process sequence RT.

(4) Operation and Advantages

With the above-described arrangement, the authentication apparatus 1 detects two or more than two corresponding pixels PX1 and PX1', PX2 and PX2', PX3 and PX3', PX4 and PX4' and PX5 and PX5' out of the pixels showing the profile of the finger from the finger-profile/blood-vessels image IM1 (FIG. 4A) and the finger-profile/blood-vessels image IM2 (FIG. 4B) obtained as a result of shooting the finger FG placed respectively at the first position and the second position located on a same plane and some of the blood vessels found in the finger FG.

Then, the authentication apparatus 1 determines the corresponding pixel differences M1 through M5 (FIG. 5) from the corresponding pixels PX and PX' and detects the finger inclination angle AN1 (FIG. 10A) relative to the reference plane on the basis of the ratios of the corresponding pixel differences M1 through M5. Then, the authentication apparatus 1 corrects the distortion of the finger-profile/blood-vessels image IM1 according to the finger inclination angle AN1.

The authentication apparatus 1 can also detects the finger inclination angle AN1 where the actual inclination of the finger FG is reflected as the inclination is detected according to the ratios of parallax. Therefore, with the authentication apparatus 1, there does not arise a situation where the image is erroneously corrected by judging the distortion of projection to be attributable not to the profile of the finger itself but to the inclination of the finger relative to the camera that picked up the image. Thus, with the authentication apparatus 1, it is possible to have an operation of authentication of a finger performed after selectively removing the distortion of projection attributable to the condition of placement of the finger FG without relying on the profile of the finger FG. Then, it is possible to improve the accuracy of authentication.

Additionally, the authentication apparatus 1 of this embodiment is adapted to detect not only the finger inclination angle AN1 relative to a reference plane but also the finger rotary angle AN2 on the basis of the ratios of the corresponding pixel differences M1 through M5 and correct the finger-profile/blood-vessels image IM1 according to the finger inclination angle AN1 and the finger rotary angle AN2.

Therefore, the authentication apparatus 1 can by far accurately eliminate the distortion of projection attributable to the change in the condition of placement of the finger FG. Thus, the accuracy of authentication is by far improved.

With the above-described arrangement of detecting two or more than two corresponding pixels PX and PX' of the profile of a finger FG from the finger-profile/blood-vessels image IM1 and the finger-profile/blood-vessels image IM2 obtained as a result of shooting some of the blood vessels found in the finger FG placed at a first position and a second position located on a same plane, detecting the finger inclination angle AN1 from the ratios of the corresponding pixel differences M1 through M5 and correcting the distortion of the finger-profile/blood-vessels image IM1 according to the angle of inclination AN1, it is possible to have an operation of authentication of a finger FG, performed after selectively removing the distortion of projection attributable to the change in the condition of placement of the finger FG without relying on the profile of the finger FG. Then, it is possible to realize an authentication apparatus 1 that operates with an improved accuracy of authentication.

(5) Other Embodiments

As a technique of acquiring a first image obtained by shooting an object of identification, which may typically be a finger FG, at a site of a living body from a first position and a second image obtained by shooting the object of identification from a second position different from the first position, the finger FG that moves substantially on a same plane is shot by means of a single image pickup camera 4 and finger-profile/blood-vessels image IM1 (FIG. 4A) and finger-profile/blood-vessels image IM2 (FIG. 4B) that correspond respectively to the first position and the second position that is different from the first position are selectively used in the above description. However, the present invention is by no means limited thereto. Alternatively, two image pickup cameras having a same configuration may be arranged respectively at the first position and the second position with the optical axes thereof running in parallel with each other or intersecting each other and a pair of images acquired as a result of shooting the finger FG by means of the image pickup cameras may be used. Such an arrangement provides advantages similar to those described above by referring to the above-described embodiment.

Still alternatively, a single image pickup camera may be slidably placed at a first position and a second position so as to make the optical axes run in parallel with each other or intersect each other at the first and second positions and a pair of images acquired as a result of shooting the finger FG by means of the image pickup camera may be used. Such an arrangement also provides advantages similar to those described above by referring to the above-described embodiment.

While a finger is used as a site of a living body to be shot by such an image pickup unit in the above-described embodiment, the present invention is by no means limited to a finger. A palm, a finger of a foot, an arm, an eye or some other site of a living body may alternatively be used for the purpose of the present invention. Additionally, while blood vessels are used as object of identification in the above-described embodiment, the present invention is by no means limited thereto and some other object of identification such as fingerprints, the profile of a part of a living body or nerves may alternatively be used for the purpose of the present invention. When nerves are used as object of identification, a marker substance that produces a specific effect on nerves may be injected into the body of a person to be identified and the marker substance may be shot by an image pickup camera to make the nerves operate as object of identification like a finger in the case of the above-described embodiment.

While the corresponding pixels PX1 and PX1', PX2 and PX2', PX3 and PX3', PX4 and PX4' and PX5 and PX5' are detected by emphasizing the profile of the finger in the finger-profile/blood-vessels image IM1 and the finger-profile/blood-vessels image IM2 and subsequently collating them to detect two or more than two corresponding pixels of the object of identification shown in the first image and the second image in the above-described embodiment, the present invention is by no means limited thereto and some other detection technique may alternatively be applied for the purpose of the present invention.

For example, an image processing technique called minutia may be used to extract junctions of blood vessels in the finger-profile/blood-vessels images IM1 and IM2 and collate them in order to detect corresponding pixels PX and PX'. With this technique, it is possible to computationally determine the length of perpendicular PD from a position on the finger to be identified to a reference plane. Then, the distortion of the finger-profile/blood-vessels image IM1 can be corrected more directly to further improve the accuracy of authentication if compared with the technique of computationally determining the length of perpendicular PD from the finger profile to a reference plane. Additionally, with this technique, it is possible to detect more corresponding pixels if compared with the technique of emphasizing the finger profile in the finger-profile/blood-vessels images IM1 and IM2 (FIG. 4). Then, the accuracy of authentication can be improved if the images contain noises that correspond to shadows due to bad shooting conditions.

Figure 12A:
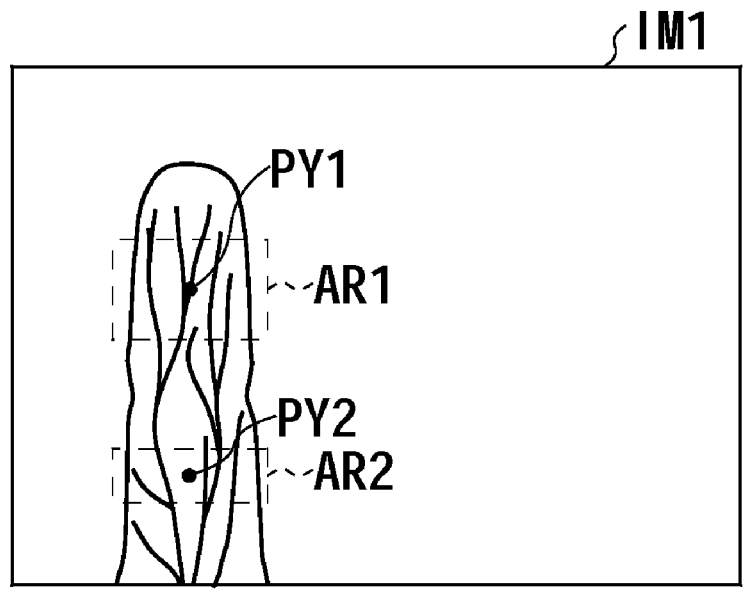
FIGS. 12A and 12B are schematic illustrations of detection of corresponding pixels by another embodiment.
Figure 12B:
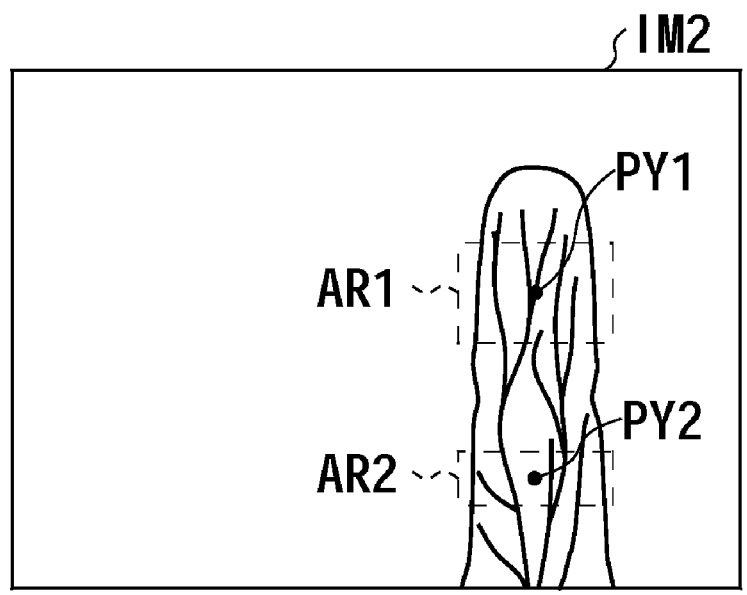

Still alternatively, a technique of cutting out predetermined corresponding regions AR1 and AR1' and AR2 and AR2' from the finger-profile/blood-vessels images IM1 and IM2 and extracting the center pixels in the cut out regions AR1 and AR1' and AR2 and AR2' as corresponding pixels PY1 and PY1' and PY2 and PY2' as shown in FIG. 12. With this technique, each area AR is handled as a plane to detect the inclination of the finger so that it is possible to detect the inclination of the finger more accurately if the finger-profile/ blood-vessels images IM1 and IM2 have only few characteristic pixels or contain noises that correspond to shadows due to bad shooting conditions. Then, the accuracy of authentication is by far improved.

While the extent of inclination of a site of a living body, or the angle of inclination of a finger AN1 (FIG. 10A), relative to a reference plane is detected by means of the ratios of the corresponding pixel differences M1 through M5 (M1/M2, M1/M3, M1/M4, M1/M5, M2/M3, M2/M4, M2/M5, M3/M4, M3/M5 and M4/M5) in the above-described embodiment, the present invention is by no means limited thereto and the angle of inclination of a finger relative to a reference plane may alternatively be detected by determining the distances from the positions on the actual finger FG that correspond respectively to the corresponding pixels PX and PX' (FIG. 5: PX1 and PX1', PX2 and PX2', PX3 and PX3', PX4 and PX4' and PX5 and PX5') to a reference plane.

The distance from a position on the actual finger FG to a reference plane can be computationally determined by means of the above-described formula (1). More specifically, it is possible to computationally determine the distance DSI (FIG. 7) between the position of placement P1 of the finger FG corresponding to the finger-profile/blood-vessels image IM1 (FIG. 4A) and the position of placement P2 of the finger FG corresponding to the finger-profile/blood-vessels image IM2 (FIG. 4B) typically on the basis of the number of images generated between the finger-profile/blood-vessels image IM1 and the finger-profile/blood-vessels image IM2 and the rate of generation of finger-profile/blood-vessels video signals by the image pickup camera 4.

Additionally, it is possible to hold the distance DS2 (FIG. 7) from the focal point F1 to the imaging plane in the ROM in advance as preset value for the distance from the position of the focusing lens to the image pickup element of the image pickup camera 4. The distance DS2 may vary according to focusing in reality but the variance in the distance DS2 is allowable as error. More specifically, the average of the distance from the focusing lens to the imaging plane when the focusing lens is closest to the object of shooting, the distance from the focusing lens to the imaging plane when the focusing lens is remotest from the object of shooting and the distance from the focusing lens to the imaging plane when the focusing lens is at an intermediary position is held as preset value. Then, the plane of the focusing lens at the averaged position operates as reference plane.

Thus, the control section 10 substitutes "H", "f" and "Z" in the formula (1) respectively with the computationally determined distance between the position of placement P1 and the position of placement P2, the distance DS2 between the focal point F1 and the imaging plane that is held as predefined value and the corresponding pixel differences M that correspond to the parallax to determine the actual position of the finger FG that corresponds to the corresponding pixels PX and PX' and the distance DS4 (FIG. 7) between the finger FG and the reference plane.

As an alternative arrangement, the finger diameter may be extracted from the picked up image in a registration mode in a condition where the finger is placed immediately above the image pickup camera 4 and registered in the flash memory 14 as reference value for the size of the finger with the identification information DIS. Then, in an authentication mode, the finger inclination angle AN1 (FIG. 10A) may be detected on the basis of the registered finger diameter and the finger diameter at the corresponding site in the finger-profile/blood-vessels images IM1 and IM2. Such an arrangement provides advantages similar to those of the above-described embodiment.

While the finger inclination angle AN1 (FIG. 10A) and the finger rotary angle AN2 (FIG. 10B) are detected for the purpose of detecting the extent of inclination of a site of a living body relative to a reference plane in the above-described embodiment, the present invention is by no means limited thereto and, alternatively, only the finger inclination angle AN1 (FIG. 10A) may be detected.

Then, while the image of the finger FG is corrected so as to make it an image picked up in a condition where the reference plane and the finger pad are in parallel with each other according to the finger inclination angle AN1 and the finger rotary angle AN2 for the purpose of correcting the distortion of the object of identification according to the angle of inclination in the above-described embodiment, the distortion would be corrected so as to make it an image picked up in a condition where the reference plane and the finger pad are in parallel with each other according to only the finger inclination angle AN1.

While the above-described embodiment includes a finger tip touching section 3 and a finger movement index section 3a (FIGS. 1 and 2) that are arranged perpendicular to the top surface 2A so as to make them operate as index for placing a finger FG in the image pickup space, the present invention is by no means limited thereto and any of various different alternative arrangements may be applied. Additionally, the finger tip touching section 3 and the finger movement index section 3a may be replaced by auditory or visual unit for notifying the condition of the finger FG placed in the image pickup space.

More specifically, the finger inclination angle AN1 (FIG. 10A) and the finger rotary angle AN2 (FIG. 10B) are detected each time blood vessel video data DA1 through DAm (or finger-profile/blood-vessels video data DB1 through DBn) are acquired as a result of successively shooting the finger by means of the image pickup camera 4 by executing a distortion correction process using the obtained current image and the image immediately preceding the current image. Then, the volume of the audio output is shifted as a function of the difference between the finger inclination angle AN1 and the finger rotary angle AN2 that are detected and the finger inclination angle and the finger rotary angle that are selected as reference each time the finger inclination angle AN1 and the finger rotary angle AN2 are detected. Alternatively, the difference between the finger inclination angle AN1 and the finger rotary angle AN2 that are detected and the finger inclination angle and the finger rotary angle that are selected as reference may be displayed on a real time basis. With such an arrangement, it is possible to reduce the extent of correcting the distortion, if any, and hence directly obtain an image faithful to the blood vessels of the actual finger FG. Then, the accuracy of authentication is by far improved.

While the above-described embodiment of the present invention is applied to an authentication apparatus 1 having an image pickup feature, a collation feature and a registration feature, the present invention is by no means limited thereto and may be applied in various different modes. For example, the present invention may be applied to an apparatus having a single feature.

The present invention can be utilized in the field for biometrics authentication.

It should be understood by those skilled in the art that various modifications, combinations, sub-combinations and alterations may occur depending on design requirements and other factors insofar as they are within the scope of the appended claims or the equivalents thereof.

What is claimed is:

1. A registration apparatus comprising:
corresponding pixel detection means for detecting two or more than two pixels in an object of identification shown in a first image obtained by capturing an image of the object of identification at a site of a living body from a first position and corresponding two or more than two pixels, whichever appropriate, in the object of identification shown in a second image obtained by capturing an image of the object of identification from a second position different from the first position and located substantially on a plane including the first position;
inclination detection means for detecting the extent of inclination of the site of the living body relative to a reference plane on the basis of the difference of each corresponding pair of pixels;
correction means for correcting the distortion of the first image or the second image according to the extent of inclination; and
registration means for registering the object of identification shown in the first image or the second image corrected for the distortion in a recording medium.

2. The apparatus according to claim 1, wherein the corresponding pixel detection means cuts out two or more than two corresponding regions in the first image and the second image and detects a corresponding pixel in each of the cut out corresponding regions.

3. The apparatus according to claim 1, wherein:
the inclination detection means detects the extent of inclination of the site of the living body and the extent of rotation of the site of the living body relative to the reference plane on the basis of the difference of each corresponding pair of pixels; and
the correction means corrects the distortion of the first image or the second image according to the extent of inclination and the extent of rotation.

4. A collation apparatus comprising:
corresponding pixel detection means for detecting two or more than two pixels in an object of identification shown in a first image obtained by capturing an image of the object of identification at a site of a living body from a first position and corresponding two or more than two pixels, whichever appropriate, in the object of identification shown in a second image obtained by capturing an image of the object of identification from a second position different from the first position and located substantially on a plane including the first position;
inclination detection means for detecting the extent of inclination of the site of the living body relative to a reference plane on the basis of the difference of each corresponding pair of pixels;
correction means for correcting the distortion of the first image or the second image according to the extent of inclination; and
collation means for collating, using the object of identification shown in the first image or the second image corrected for the distortion as object of collation.

5. The apparatus according to claim 4, wherein the corresponding pixel detection means cuts out two or more than two corresponding regions in the first image and the second image and detects a corresponding pixel in each of the cut out corresponding regions.

6. The apparatus according to claim 4, wherein:
the inclination detection means detects the extent of inclination of the site of the living body and the extent of rotation of the site of the living body relative to the reference plane on the basis of the difference of each corresponding pair of pixels; and
the correction means corrects the distortion of the first image or the second image according to the extent of inclination and the extent of rotation.

7. An image correction method comprising:
a first step of acquiring a first image obtained by capturing an image of an object of identification at a site of a living body from a first position and a second image obtained by capturing an image of the object of identification from a second position different from the first position and located substantially on a plane including the first position;
a second step of detecting two or more than two pixels in the object of identification shown in the first image and corresponding two or more than two pixels, whichever appropriate, in the object of identification shown in the second image;
a third step of detecting the extent of inclination of the site of the living body relative to a reference plane on the basis of the difference of each corresponding pair of pixels; and
a fourth step of correcting the distortion of the first image or the second image according to the extent of inclination.

8. A computer readable medium with a program having a set of instructions stored thereon which when executed by a processor of a computer executes a method comprising:
detecting at least two pixels in an object of identification shown in a first image, the first image obtained by capturing an image of the object of identification at a site of a living body from a first position, and
detecting at least two corresponding pixels, whichever appropriate, in the object of identification shown in a second image, the second image obtained by capturing an image of the object of identification from a second position, the second position being different from the first position and located substantially on a plane including the first position;
detecting an extent of inclination of the site of the living body relative to a reference plane on the basis of the difference of each corresponding pair of pixels of the first and second images;
correcting the distortion of the first image or the second image according to the extent of inclination.

9. A registration apparatus associated with a control section of a computer that includes a processor and functional units having a set of instructions which when executed by the processor operate to register an object of identification, the functional units comprising:
a corresponding pixel detection unit that detects two or more than two pixels in the object of identification shown in a first image obtained by capturing an image of the object of identification at a site of a living body from a first position and corresponding two or more than two pixels, whichever appropriate, in the object of identification shown in a second image obtained by capturing an image of the object of identification from a second position different from the first position and located substantially on a plane including the first position;
an inclination detection unit that detects the extent of inclination of the site of the living body relative to a reference plane on the basis of the difference of each corresponding pair of pixels;
a correction unit that corrects the distortion of the first image or the second image according to the extent of inclination; and a registration unit that registers the object of identification shown in the first image or the second image corrected for the distortion in a recording medium.

10. A collation apparatus associated with a control section of a computer that includes a processor and functional units having a set of instructions which when executed by a processor of the computer operate to collate an object of identification, the functional units comprising:

a corresponding pixel detection unit that detects two or more than two pixels in the object of identification shown in a first image obtained by capturing an image of the object of identification at a site of a living body from a first position and corresponding two or more than two pixels, whichever appropriate, in the object of identification shown in a second image obtained by capturing an image of the object of identification from a second position different from the first position and located substantially on a plane including the first position;

an inclination detection unit that detects the extent of inclination of the site of the living body relative to a reference plane on the basis of the difference of each corresponding pair of pixels;

a correction unit that corrects the distortion of the first image or the second image according to the extent of inclination; and a collation unit that collates, using the object of identification shown in the first image or the second image corrected for the distortion as object of collation.

* * * * *